May 8, 1962     J. L. QUINN ETAL     3,033,444
APPLICATION OF CODED INDICIA TO RECORDS
Filed Oct. 20, 1958     6 Sheets-Sheet 1
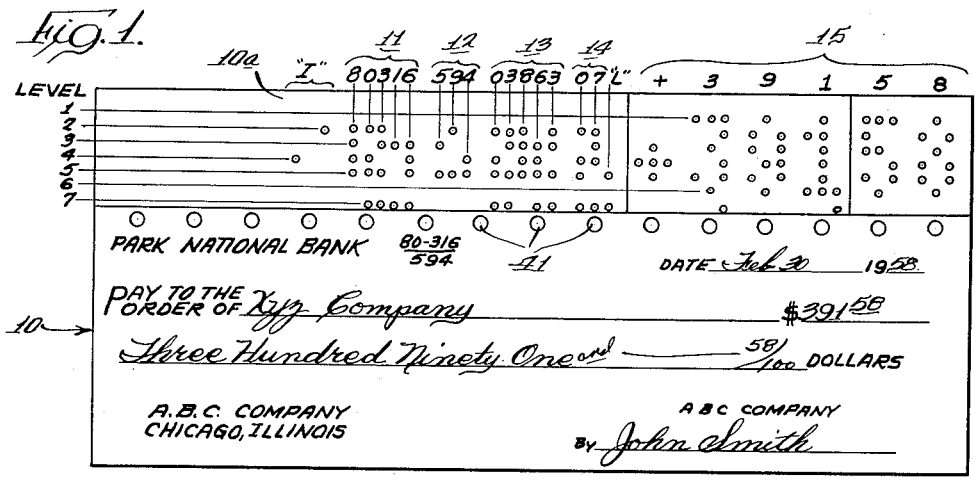
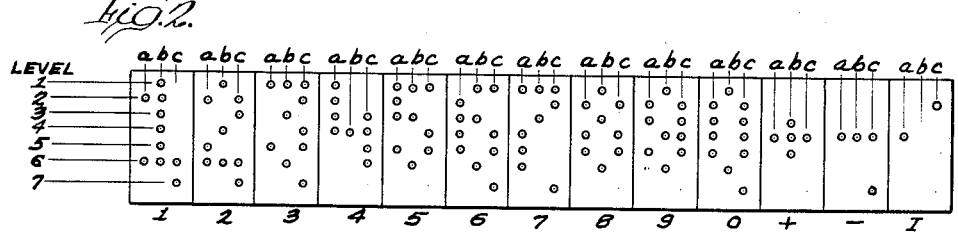
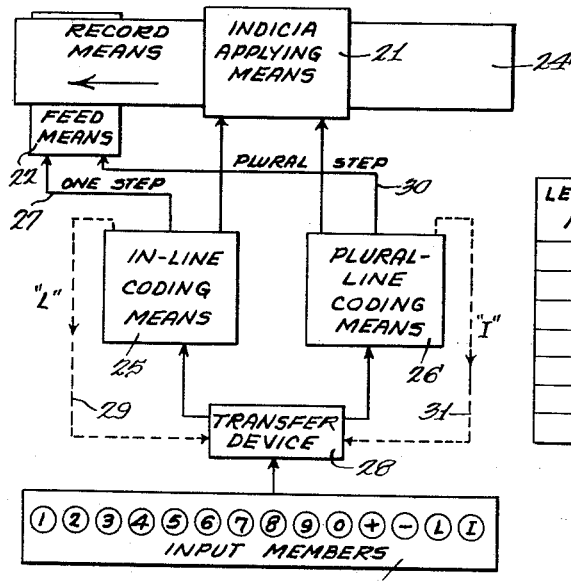
INVENTORS.
James L. Quinn
John E. Jones
By Carlson, Pitzner, Hubbard & Wolfe
Attys

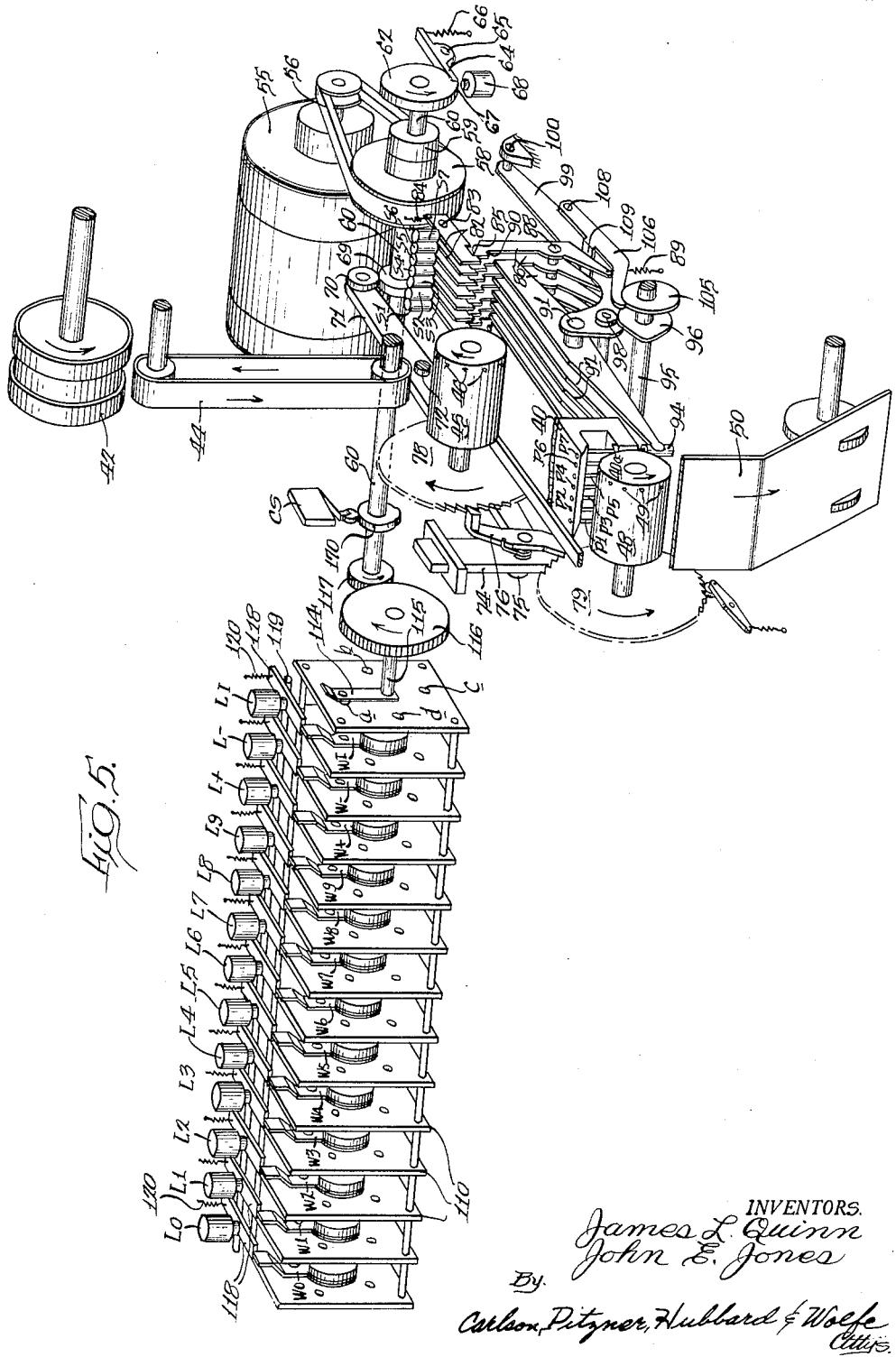

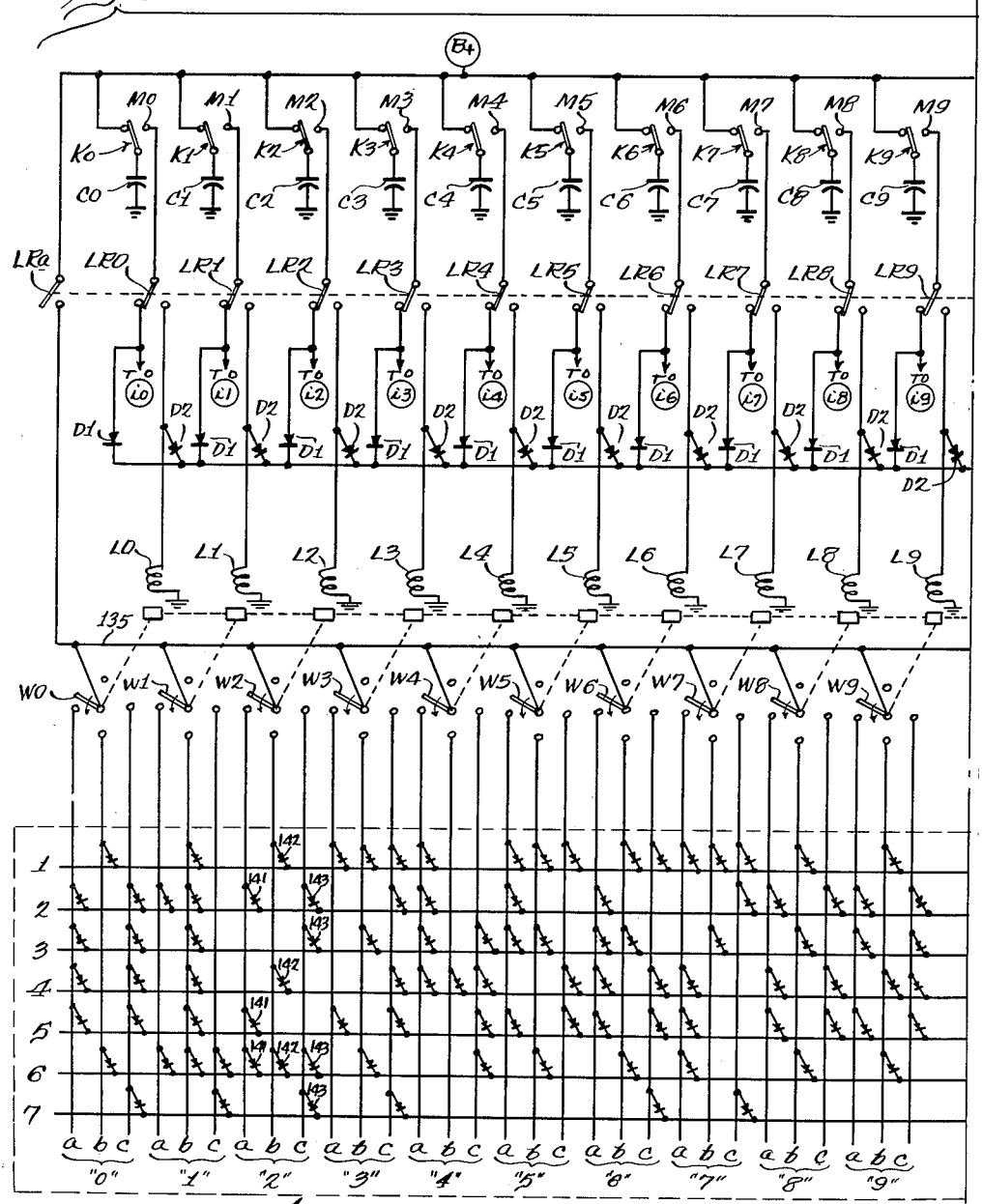

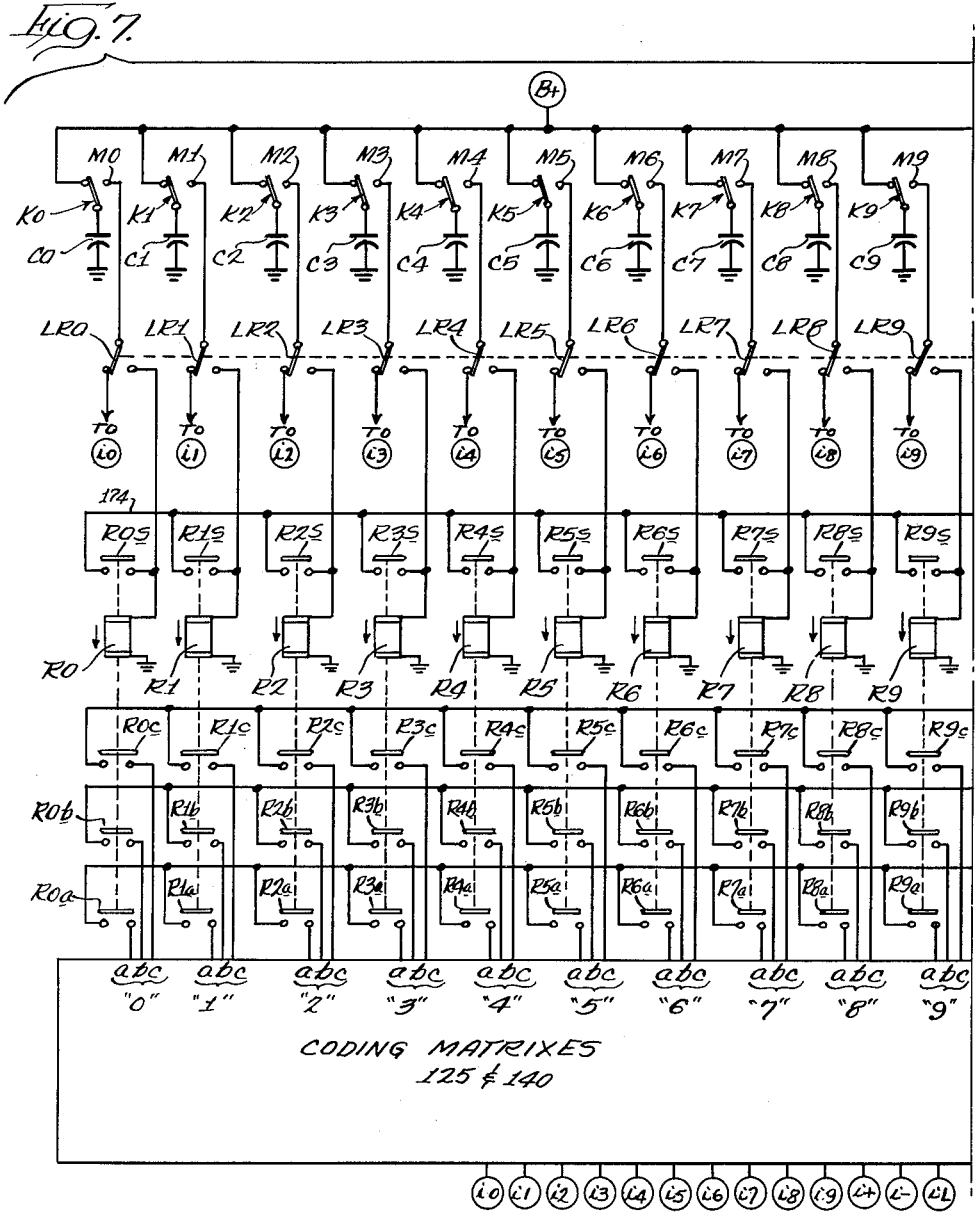

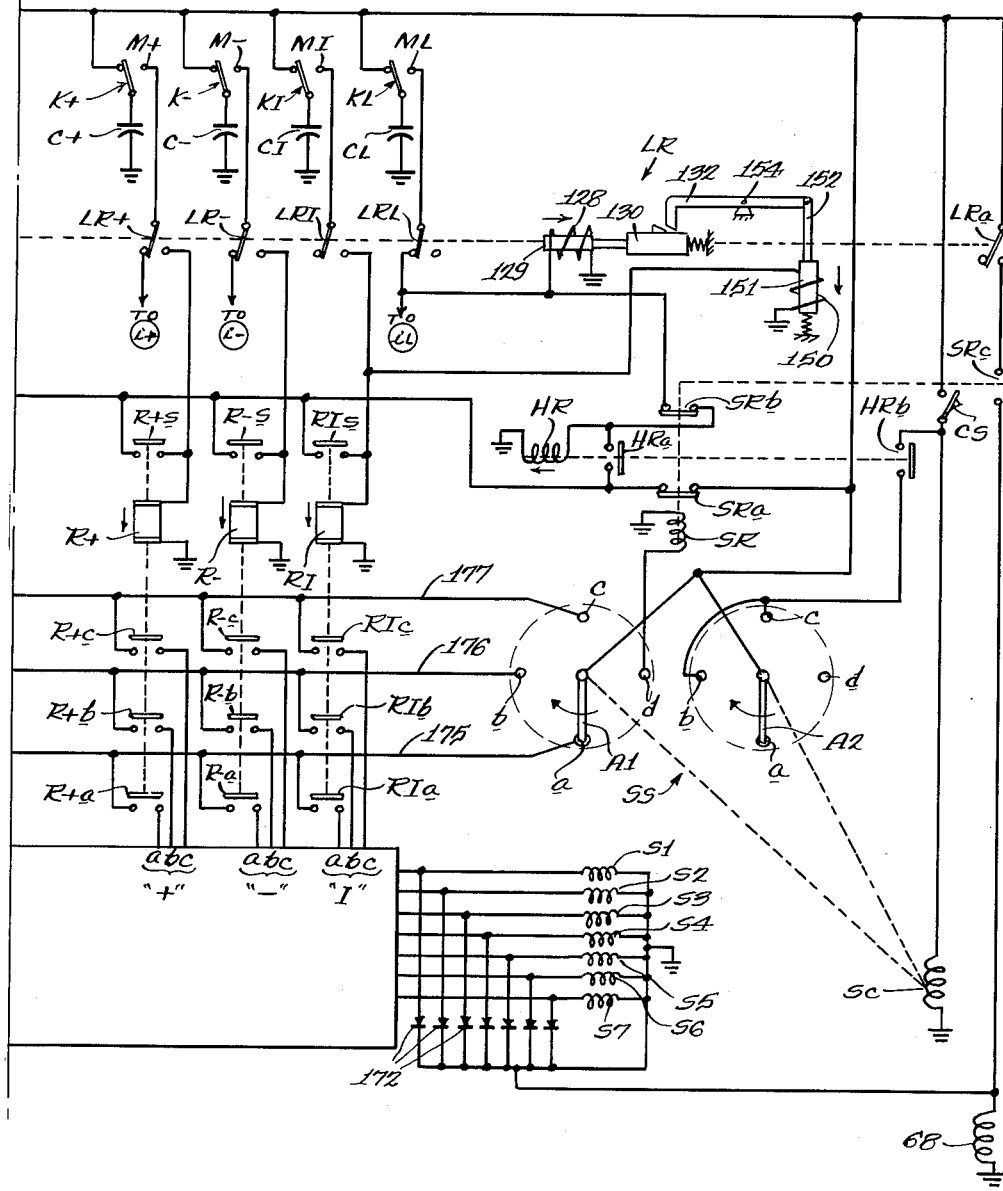

United States Patent Office 3,033,444
Patented May 8, 1962

3,033,444
APPLICATION OF CODED INDICIA TO RECORDS
James L. Quinn, Chicago, and John E. Jones, Wilmette, Ill., assignors to Cummins-Chicago Corp., Chicago, Ill., a corporation of Illinois
Filed Oct. 20, 1958, Ser. No. 768,435
20 Claims. (Cl. 234—41)

This invention relates in general to coding means, and in particular to the application of coded indicia representative of different characters to a record medium.

It is the general aim of the invention to facilitate the application of coded indicia to a record medium to represent any of several characters in either of two codes, the first being a single-line code and the second being a plural-line code.

More particularly, it is an object of the invention to provide for the application of indicia to a record medium, such as a paper business document, to represent characters in either or both an illegible in-line code which requires but little space for each character, or in a visibly legible plural-line code in response to input signals applied to a common set of keys or other input members.

Another object of the invention is to provide a novel and advantageous arrangement for applying a plurality of lines of indicia to a record medium, each successive line being coded in accordance with a plural-line legible code, in response to but a single input signal or key actuation.

It is a further object to provide for automatic conversion from in-line code application to plural-line code application as an incident to input signals corresponding to code-identifying prefix characters.

Still another object is to provide an improved record medium or business document which has a large number of different characters represented thereon by coded indicia susceptible of reading by automatic reading equipment, a part of the characters being represented by a first in-line code which requires little space per character and another part of the characters being represented by a plural-line code which makes each such character visibly legible.

Other objects and advantages will become apparent as the following description proceeds, taken in conjunction with the accompanying drawings, in which:

FIGURE 1 illustrates a record medium or paper document showing coded indicia applied thereto in accordance with the invention;

FIG. 2 shows a plural-line, legible code system used to represent any of a plurality of different characters;

FIG. 3 shows an exemplary in-line, illegible code system used to represent any of a plurality of different characters;

FIG. 4 is a block-and-line diagram showing the general organization of indicia-applying apparatus embodying the invention;

FIG. 5 is a perspective illustration of a feeding and indicia-applying mechanism;

FIG. 7 is a schematic diagram of a modified form of electrical controls which, together with the mechanism of FIG. 5, constitute a second embodiment of the invention.

Figure 6:
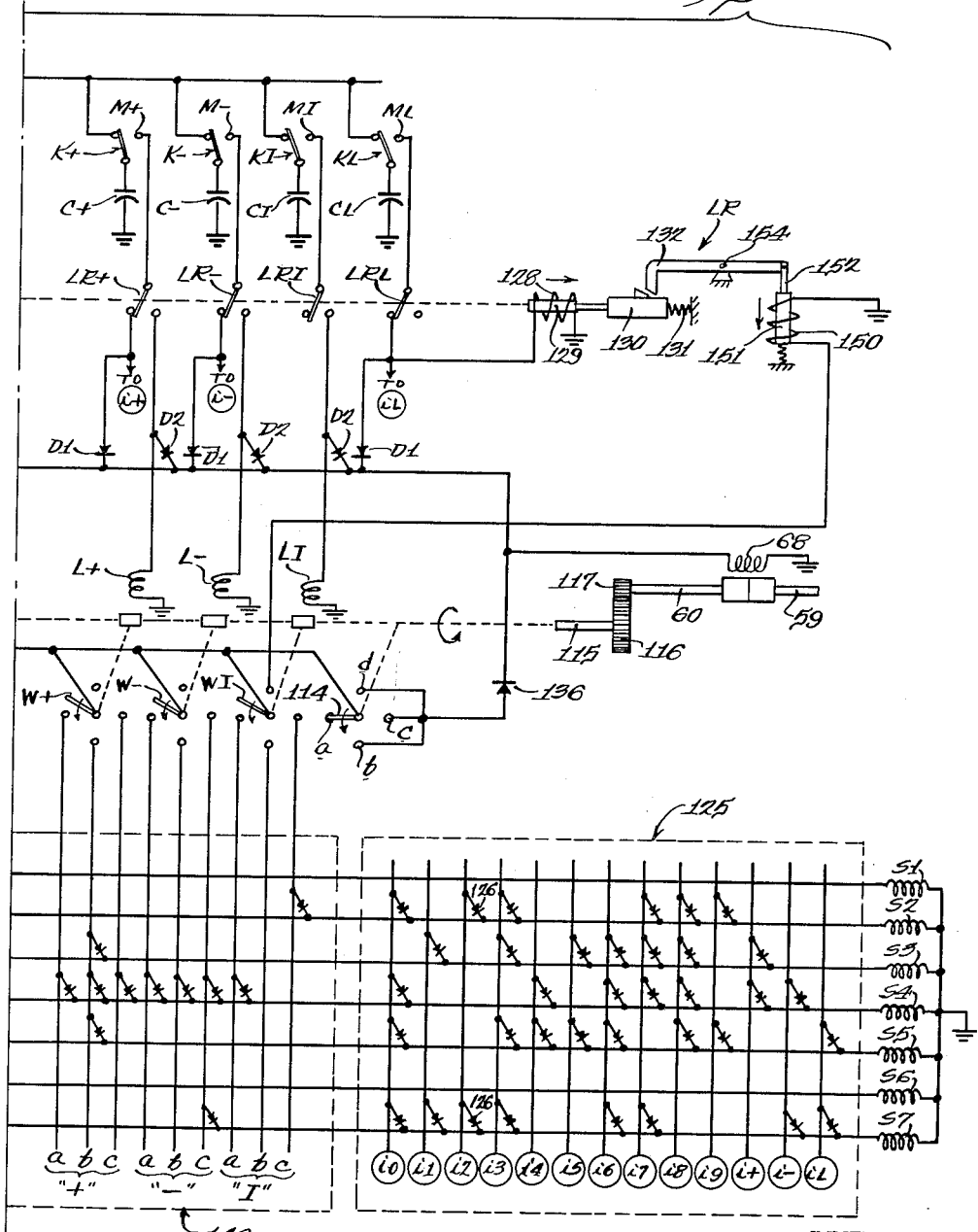
FIG. 6 is a schematic diagram of electrical controls associated with the mechanism of FIG. 5.

While the invention has been shown and will be described in some detail with reference to particular embodiments thereof, there is no intention that it thus be limited to such detail. On the contrary, it is intended here to cover all modifications, alterations, and equivalents falling within the spirit and scope of the invention as defined by the appended claims.

Referring now to FIG. 1, a record medium is there shown as a typical commercial document or check 10, which in its lower area is conventional in format and written or printed contents. In modern business practices, it is desirable to "process" the significant information or numerical data of the check 10 or other similar business documents by sorters, tabulators, computers or other such business machines. To do this requires that the data be represented by indicia which can be "read" by equipment which creates the electric signals or responses constituting the input "language" of such business machines. Thus, it is necessary in the first instance to apply indicia to the check in a form which is "readable" by reading equipment, and then to provide apparatus which can perform the reading operation.

In the present instance, the indicia applied to the check 10 is of binary form. That is, it is "binary" in the sense that a "spot" at a given location is either present or absent for each of the several characters to be represented. Each character is represented according to the presence or absence of indicia "spots" in certain combinations of locations. This form of coded indicia character representation enables the reading apparatus to function by sensing one of two conditions, i.e., the presence or absence of an indicia "spot" at each significant location.

While the indicia or "spots" may take a variety of forms, such as non-reflective ink dots on a reflective paper document (so as to be susceptible of sensing by photoelectric means), the particular type of indicia "spots" here shown on the check 10 are small holes or perforations. Although the invention is not restricted to the use of indicia in the form of perforations, the latter are advantageous in that they can be applied to several documents at one time by simultaneously punching a stack, they are not readily mutilated or distorted, and they do not totally obliterate any printed or written characters which appear in the same area.

There are conflicting requisites as to the nature of the coding system employed to represent characters. On the one hand, the coded indicia to represent each character should consume only a small area in order that a relatively large number of characters can be applied to a document of a given size without appreciably encroaching upon the space for conventional printing and writing. On the other hand, certain characters should be visibly legible, i.e., readily readable to any observer in order that they can be quickly and readily verified by individuals handling the documents, and in order to safeguard against unauthorized alteration of written numbers.

In accordance with one feature of the invention, characters are represented on the record medium or check 10 by two code systems. As shown in FIGURE 1, the area 10a along the upper edge of the check 10 has applied thereto a first series of vertically oriented lines of perforations, with perforations being located in different combinations or positions within each line such that the five digit number "80316" is represented. This number, collectively represented by the code line group at 11, corresponds to a Federal Reserve routing number for the check 10, and each character or digit of that number is represented by an in-line perforation code. A second group 12 of three perforation lines represents the corresponding digits of a bank-identifying number "594."

The succeeding group 13 of five perforation lines represents the successive digits "03863" of an account number in the drawee bank, while the following group 14 of two lines of perforations represents a transaction code number "07."

At the right end of the area 10a, the amount of the check is represented by indicia applied according to a different code, and specifically a code in which each character is represented or so located as to make each character visibly legible. As here shown, that group of indicia lines indicated collectively at 15, represents the amount of the check, i.e., "+391.58."

The particular code system utilized in the present instance to represent different characters in legible or visually readable form is illustrated in FIG. 2. The locations of perforations in a rectangular matrix field required to represent the numerical characters 0–9, +, −, and "I" are there shown. Each character is represented by a plurality of $n$ lines, where $n$ in the present instance is 3. The lower case letters $a$, $b$ and $c$, respectively, designate the first, second and third lines in each plural-line code character. There are seven possible levels within each rectangular field and these are numbered from top to bottom at the left of FIG. 2. The particular location of perforations in the rectangular field for any of the numerical characters will be apparent simply from an inspection of FIG. 2. For example, to represent the character "5," it is necessary to provide perforations at levels 1, 2, 3 and 5 in the first line $a$, to provide perforations at levels 1, 3 and 6 in the second line $b$, and to provide perforations at levels 1, 4, and 5 in the third line $c$. The perforations which appear at the lowermost or seventh level for the characters "1," "2," "3," "6," "7," "0," and "—" are not strictly necessary in order to make those characters visibly legible. However, they are employed here in order that reading means can sense and identify each particular character with a higher degree of accuracy.

The arbitrary combination of perforations at different levels within a single line to represent different coded or illegible characters which are not visually readable to any observer is illustrated in FIG. 3. As there shown, the numerical characters 0 through 9, +, −, and "L" may be represented by perforations located in different combinations of the seven possible levels within one line. Actually, since no perforations ever appear at level 1 or at level 6, this is a five-level or five-channel arbitrary code system. For example, to represent the character "4," it is only necessary that perforations be located at levels 4 and 5 with a single perforation line.

It will be apparent that the combinations of holes shown in successive vertical lines in the check 10 represent the several groups of numbers, as labeled. That is, the group of five in-line code lines shown at 11 in FIG. 1, respectively represent the digits in the number "80316" according to the in-line code of FIG. 3. In like manner, it will be seen that the group of perforation lines at 15 visibly represent the characters "+39158" (corresponding to the amount of the check $391.58) where each character is represented by a group of three lines with perforations at different levels therein according to the plural-line code of FIG. 2. Each of these three-line code groups of perforations are separated by a vertical space, i.e., a line containing no perforations at all.

The group of illegible, in-line code representations on the check 10 are preceded by a plural-line code character "I" at the extreme left (FIG. 1). As shown in FIG. 2, the character "I" is represented in the plural-line code by the presence of a perforation or indicia spot at level 4 in line $a$ and at level 2 in line $c$. This character "I" is a prefix character which precedes a group of illegible in-line coded representations. It signifies to reading apparatus that the following coded indicia (i.e., following to the right on the document) are in "illegible" form.

Just preceding the first plural-line code character "+," there is an in-line code representation for the prefix character "L." As indicated in FIG. 3, the character "L" is represented by the presence of perforations at levels 5 and 7 within a single line. The purpose of this character is to signify to reading apparatus that the following characters (i.e., following to the right) are in plural-line, legible code form and should not be read as individual lines, but as groups of lines.

Once indicia in the form of perforations have been applied to the check 10 (FIG. 1) in the two codes described, that coded indicia can be sensed or read by automatic reading equipment which will identify each of the individual characters and supply appropriate responses, such as electrical signals, to automatic business machines, such as sorters or data processors. The reading equipment may take the form disclosed and claimed in our copending application, Serial No. 768,436, filed October 20, 1958.

The present invention is concerned primarily with the problem of applying indicia to a record medium, such as the check 10, to represent characters in either or both an in-line code and a plural-line code.

Referring first to the block-and-line diagram in FIG. 4, apparatus embodying the invention is there shown as comprising input members 20, each of which is assigned, as labeled, to one of the several different characters which are to be represented by coded indicia on the check 10. It is to be understood, however, that a greater number of characters, in addition to those illustrated in the present instance, may be accommodated. The apparatus further comprises indicia-applying means 21 which may take a variety of forms and which include a plurality of elements for applying indicia at different locations in a given field. The indicia-applying means cooperate with feeding means 22 which advance a record medium 24 past the indicia-applying means.

Since the representation of a given character in the two coding systems requires application of not only a different number of lines of indicia but also at different levels within any given line, an in-line coding means 25, and a plural-line coding means 26 are employed. The several input members 20 are connected selectively either to the first coding means 25 or the second coding means 26 through a transfer device 28, and both the coding means are operatively connected, as indicated, in controlling relationship to the indicia-applying means 21. When the transfer device 28 connects the input members 20 to the first coding means 25, then responses to input signals or actuation of the respective input members are passed from the first coding means 25 to the indicia-applying means 21. Each time the first coding means 25 receives an input signal, the indicia-applying means are properly actuated and the feed means 22 are caused, by a signal applied to the converter 27, to advance the record medium 24 through one step equal to the width of one code line.

If, however, the prefix character "L" is applied to the record medium 24 through the first coding means 25, then a signal is applied over the connector 29 to the transfer means 28, causing the latter to switch operative connection of the input members 20 away from the first coding means 25 and to the second coding means 26.

Thereafter, as each input member is actuated or receives a signal, an appropriate response is supplied from the plural-line coding means 26 to the indicia-applying means 21. Each time this occurs a signal is supplied over the line 30 to make the feed means 22 advance the record medium 24 a plurality of steps.

If the prefix code character "I" is applied to the record medium 24, then an appropriate signal is fed back over the connection indicated at 31 to the transfer means 28, thereby causing the latter to switch operative connection from the plural-line coding means 26 to the in-line coding means 25. In this manner, the in-line coding means 25 and the plural-line coding means 26 are selectively and complementally activated, that is, one is operative when the other is inoperative.

For a better understanding of the system generally represented by FIG. 4, reference is made to the detailed embodiment illustrated in FIGS. 5 and 6 which, respectively, show the mechanical and electrical portions of indicia-applying apparatus constructed in accordance with the present invention. As shown in FIG. 5, the mechanism includes a plurality of indicia-applying elements which, for the specific case of indicia in the form of perforations, are perforating pins P1–P7 which underlie holes formed in a die block 40. The respective pins P1–P7 are aligned in a single row and spaced apart by distances which correspond to the spacing between the seven levels of a line of perforations (FIGS. 2 and 3).

For the purpose of feeding record mediums such as the check 10 (FIGURE 1) successively past the perforating pins P1–P7, each such medium or check is provided with a plurality of large feed holes 41 (FIG. 1) which are adapted to be engaged with the radial teeth on angularly stepped drums. The feeding mechanism which numerically alines the perforation area 10a of successive documents like the check 10, may be constructed as disclosed and claimed in the co-pending application of William H. Dreyer, Serial No. 78,773, filed December 27, 1960 (a continuation-in-part of the application of William H. Dreyer, Serial No. 768,408, filed October 20, 1958, now abandoned) and assigned to the assignee of the present application. It will be sufficient to note here only that a stack of unperforated documents may be placed in a feed magazine (not shown) associated with a mechanism which includes a feed roller 42 for advancing individual checks successively onto a moving endless belt 44. As the leading edge of each check approaches the periphery of a drum 45, the feed holes 31 therein have been automatically alined in a direction lengthwise of that drum with radially projecting teeth 46 disposed in a circular array on the drum surface. The teeth 46 are spaced apart circumferentially of the drum by a distance equal to the spacing of the feed holes 41, and means are provided (as described in the aforesaid co-pending Dreyer application) to cause each successive document to have the feed holes 41 therein engage with the teeth 46.

As each document is fed clockwise (FIG. 5) with the surface of the moving drum 45, it will pass over the die block 40 and be positioned so that the successive blank lines for receiving perforations are brought into registry with the pins P1–P7. To further assure precise positioning of each document, a second drum 48, identical to the first drum 46, and having radially projecting teeth 49 is employed. After the leading edge of each document of record medium passes over the perforating pins P1–P7, the feed holes 41 therein will engage the teeth 49. From the drum 48 the document is passed to a transfer surface 50 over which it passes to a delivery hopper (not shown).

To cause the documents to be advanced intermittently so that each line for receiving perforations is brought successively into registry with the pins P1–P7, the feed mechanism includes a continuously running motor 55 which drives a pulley 58 through a belt 56. The pulley has an integral sleeve 59 which is frictionally coupled to a shaft 60. Normally, the shaft 60 is held stationary (so that the sleeve 59 slips relative thereto) by the tip 61 of a cam 62 fast on the shaft 60, engaged with a pawl 64 pivoted at 65 and biased clockwise by a spring 66. Magnetically coupled to and associated with the pawl 64 is a clutch coil 68 which, when energized, holds the end of the pawl 64 downwardly, thereby permitting the sleeve 59 to frictionally drive the shaft 60. If the coil 68 is deenergized the cam tip 61 will then reengage the pawl 64. On the other hand, if the coil 68 is energized for a period of extended duration, then the shaft 60 will be continuously driven through successive revolutions until such time that the coil is deenergized.

As the shaft 60 begins each of its revolutions, a cam 69, rigid therewith and engaged by a follower 70 on one end of a lever 71, will rock the latter about its pivot or fulcrum 72. This will raise and lower a vertical slide bar 74 which is pivotally connected at 75 to the forward end of the lever 71. Pivoted to the slide bar 74 is a double-ended pawl 76 which at its opposite ends engages the teeth on ratchet wheels 78 and 79. The ratchet wheels 78, 79 are, in turn, rigidly connected to the drums 45 and 48 so that the latter will be angularly stepped in the directions indicated by the arrows in FIG. 5 through one incremental distance each time that the shaft 60 makes one revolution.

The sizing of the teeth on the ratchet wheels 78, 79 is such that the documents engaged with the teeth 46 and 49 of the drums 45 and 48 will be advanced a distance equal to the width of one perforation line each time that the shaft 60 makes one revolution. This feeding mechanism is described in greater detail in the above-identified Dreyer application, to which reference may be made.

In order to selectively actuate the pins P1–P7 in different combinations so as to cause perforation of holes at the desired levels or positions after the document has been advanced one step, a plurality of selector solenoids S1–S7 are associated with a corresponding plurality of latch arms 82, pivoted on a rod 83 with their forward tips biased downwardly by suitable springs 84. The forward end or tip of each arm 82 is formed with a notch 85 which normally receives and holds retracted the upper end of a corresponding one of a plurality of interposer levers 86. The interposer levers are all pivoted on a common rod 88 and shaped as bell cranks with their lower ends connected to tensioning springs 89 which bias them in a counterclockwise direction (FIG. 5). The upper end of each interposer is formed with a notch 90.

To actuate the pins P1–P7, a plurality of floating levers are pivoted at their mid-portions on a bar 91, and have their rear ends disposed just forwardly of the notches 90 in the interposers 86, when the latter are held in latched positions by the arms 82. The forward ends of the floating levers 92 are pivotally received in weighted blocks 94 which are rigidly connected to the lower ends of the pins P1–P7, the latter being slidable through holes in a projecting shelf 40a integral with the die block 40. The weight of each block 94 normally urges the associated pin downwardly, and thus biases each of the associated floating levers 92 in a counterclockwise direction about the pivot bar 91.

For the purpose of actuating selected ones of the perforating pins P1–P7, a second shaft 95 is driven (by means not shown) in unison with the shaft 60. A punch cam 96 is rigidly mounted on the shaft 95 and engaged with a follower 98, carried by a punching lever 99, pivoted at 100 and supporting the pivot bar 91. The cam 96 is so shaped and positioned on the shaft 95 that it will raise the follower 98 and the pivot bar 91 very shortly after the drums 45 and 48 have been stepped to advance a document engaged therewith. When the bar 91 is raised, the floating levers 92 normally rock about their fulcrum connection with the weighted blocks 94 if the interposers 86 associated therewith are held in a latched position by the associated arms 82. However, if certain ones of the solenoids S1–S7 have been momentarily energized and their associated arms 82 momentarily raised so that the corresponding interposers are released and rock forwardly to have their notches engage the rear ends of the corresponding floating levers 92, then when the bar 91 is raised by the punch cam 96, those particular floating levers will rock about their rear ends as fulcrum points, thereby raising the weighted blocks 94 at their forward ends, and shifting the associated perforating pins upwardly to punch holes in the document which overlies the die block 40.

Following this punching of holes at selected levels of a perforation line, a second cam 105 rigid with the shaft 95 will rock a reset lever 106 upwardly about its pivot connection 108. The reset lever 106 carries a laterally extending plate 109 which extends beneath the lower portions of all of the interposers 86. Thus, when the plate 109 is raised, it will rock the released interposers 86 clockwise about their common pivot 88 and cause the upper ends of such interposers to be relatched under their associated arms 82.

To review briefly the operation of the mechanism in FIG. 5, let it be assumed that it is desired to punch perforations in a line to represent the character "5" by the in-line code of FIG. 3. Since perforations must appear at levels 3 and 5 of the line, the solenoids S3 and S5 will be momentarily energized. This will momentarily raise the associated latch arms 82 and release the corresponding interposers 86 so that their upper ends rock forwardly to engage the rear ends of the associated floating levers. Then, the clutch coil 68 will be momentarily energized so that the sleeve 59, frictionally engaged with the shaft 60, will drive the latter shaft through one revolution. With this, the cam 69 will first rock the lever 71 and cause the pawl 76 to rotate the drums 45, 48 through one angular step which advances the document engaged therewith a distance equal to the width of one perforation line. Next, the cam 96 on the shaft 95 will raise the lever 99 and the bar 91, causing the floating levers 92, associated with the solenoids S3 and S5, to rock about their rear ends as fulcrum points, thus raising the pins P3 and P5 to punch holes in the document or record medium. The remaining floating levers will rock about their forward ends as fulcrum points, so that the pins P1, P2, P4, P6 and P7 will not be elevated and will not punch holes in the paper document. Finally, the cam 105 will elevate the reset lever 106, and the plate 109 will rock the previously released interposers 86, associated with the solenoids S3, S5, clockwise so that the upper tips of such interposers are reengaged with the associated latch arms 82. The mechanism is then ready to repeat another cycle of operation.

For a purpose to be made clear below, there is associated with the mechanism of FIG. 5 a plurality of rotary members or parts adapted to be selectively driven in timed relation to the shaft 60 which, as previously noted, produces one cycle of feeding and perforating for each revolution thereof. As here shown, each of the rotary parts is in the form of a switch wiper arm, there being one such wiper arm for each of the characters to be represented. In the present instance, there are provided wiper arms W0–W9 corresponding to the characters "0"–"9" and, in addition, wiper arms W+, W−, and WI corresponding to the characters +, −, and I. Associated with each of the wiper arms is a plate 110 made of suitable insulating material and carrying a plurality of stationary electrical contacts angularly spaced in this instance at 90° intervals. The four such contacts associated with each of the respective wiper arms are designated a, b, c and d (FIG. 5) for an auxiliary wiper arm 114.

Each of the wiper arms W0–W9, W+, W− and WI is formed integrally with a collar having slippable, frictional engagement with a shaft 115 connected by gears 116, 117 to the shaft 60 of the perforating mechanism. These friction collars constitute parts of one-revolution clutches which further comprise pawls 118, pivoted on a rod 119, and having their forward ends biased downwardly to limit positions by appropriate springs 120. Each of the wiper arms W0–W9 and W+, W− and WI includes an extremity which will engage the forward end of the associated one of the pawls 118. Under these conditions, the wiper arms are held stationary and prevented from rotating with the shaft 115 due to slipping action of the associated collars frictionally engaged with that shaft. The position of each wiper arm when held by its pawl 118 is such that it is free of engagement with the first stationary contact a, but will immediately engage that contact as soon as the shaft 115 rotates slightly in the direction indicated.

Magnetically coupled to the respective pawls 118 are a plurality of clutch-controlling coils L0–L9, L+, L−, and LI. Whenever any one of these coils is energized, it will cause the associated pawl to be rocked upwardly, thereby freeing that pawl from engagement with the associated wiper arm. Thereafter, as the shaft 115 rotates through successive 90° increments, that wiper will rotate through 90° increments until it has completed one revolution and reengages the released pawl.

The auxiliary wiper 114 is rigidly connected to the shaft 115 so that it will always rotate in unison with the latter. The remaining wiper arms, however, will be held stationary under normal conditions and permitted to make one revolution with the shaft 115 only when their associated coils are momentarily energized.

In the present instance, the legible code characters are represented by n lines where n is 3 (see FIG. 2). Whenever such legible characters are successively applied to a record medium or paper document, however, they are separated by a space equal to the width of one perforation line. Thus, each legible character preferably occupies a total of (n+1) lines, e.g., four lines, the first three lines receiving perforations and the fourth line receiving no perforations to constitute a space. The gears 116 and 117 are so related in diameter as to produce a 4 to 1 reduction in the drive of the shaft 115 from the shaft 60. That is, the shaft 115 will here make one-quarter revolution for each complete revolution of the shaft 60.

The organization and operation of the associated electrical controls of FIG. 6 may now be understood. For receiving input information as to the characters to be applied by coded indicia on a record medium, a plurality of input members or terminals are provided, each one being assigned to a different one of the several characters. As shown in FIG. 6, input terminals M0–M9, M+, M−, ML and MI are shown as corresponding to the characters whose plural-line and in-line codes are indicated in FIGS. 2 and 3. Signals can be applied to these input terminals or members in a variety of ways. In the present instance, these input terminals are the normally open contacts of double-throw key switches K0–K9, K+, K−, KI and KL. The keys which control these switches may be the keys of a typewriter keyboard or the like.

To produce a short current pulse into each of the input terminals in response to actuation of the associated key switch, a movable element of each such switch is normally engaged with a stationary contact connected to a positive voltage source, here conventionally represented by the symbol B+. The movable part of each key switch is normally connected to the opposite side of the voltage source (conventionally represented as ground), through a storage device or capacitor, there being one capacitor for each key switch here, respectively, designated C0–C9, C+, C−, CI and CL. Thus, as the key switches K0–K9, K+, K−, KI and KL are successively and individually actuated, energy stored in the respective capacitors C0–C9, C+, C−, CI and CL will be transferred to the respective input terminals M0–M9, M+, M−, MI and ML.

Further, in accordance with the invention, first means are provided to cause the feeding means previously described to advance the record medium or document one step in response to actuation of any one of the key switches, i.e., in response to the application of the input signal on any one of the several input terminals. Moreover, means are provided which are responsive to the actuation of any one of the key switches to cause the indicia-applying elements or punching pins P1–P7 (FIG. 5) to be activated in a particular combination which corresponds to the in-line code for the character assigned to that particular key switch.

In accomplishing these two functions, the input terminals M0–M9, M+, M−, MI, and ML are each connected through a corresponding set of double-throw switch contacts LR0–LR9, LR+, LR−, LRI and LRL, which are controlled by a latching relay LR, to a plurality of input terminals i0–i9, i+, i−, and iL. Each of these latter terminals is connected through an isolating diode D1 to one side of the clutch coil 68, the latter having its opposite side grounded. Therefore, whenever any one of the key switches (except the switch KI) is actuated, a short current pulse will be supplied to the clutch coil 68. The latter, as previously described in connection with FIG. 5, will permit the shaft 60 to be driven through one revolution, causing the ratchet wheels 78, 79 and drums 45, 48 to advance a document engaged thereon a distance equal to the width of one perforation line.

Simultaneously with the energization of the clutch coil 68, one of the input terminals i0–i9, i+, i—, or iL, will also receive a current pulse passed into a first coding matrix 125. This coding matrix has thirteen input conductors, corresponding to the respective input terminals, and seven output conductors leading through the respective selector solenoids S1–S7 to ground. Each of the input conductors is connected by asymmetrically conductive elements, here shown as diodes, to a particular combination of the seven output lines which correspond to the levels at which indicia or perforations must appear according to the in-line code of FIG. 3 in order to represent any of the respective characters. The manner in which the diodes within the coding matrix 125 are located in order to bring this about will be apparent from inspection of FIG. 6, the diodes serving to energize a unique combination of the output conductors or selector solenoids in response to current flowing into each one of the input terminals.

Merely by way of example, it may be observed from FIG. 3 that the character "2" is represented in the in-line code by holes punched at levels 2 and 7. As shown in FIG. 6, the input terminal i2, corresponding to the character "2," has diodes 126 leading therefrom to the output conductors connected to the selector solenoids S2 and S7. Therefore, in response to momentary actuation of the switch K2, the capacitor C2 will discharge through the input terminal M2 and pass current through contacts LR2 both to the clutch coil 68 and to the input terminal i2 of the coding matrix 125. The momentary energization of the clutch coil 68 will cause the shaft 60 (FIG. 5) to make one revolution, thereby advancing the document one step; and simultaneously current flowing into the terminal i2 will pass through the diodes 126 and the selector solenoids S2 and S7 to ground. Momentary energization of these latter selector solenoids will result in their corresponding interposers 86 (FIG. 5) being unlatched, so that as the shaft 60 completes its single revolution, the floating levers 92 will lift only the pins P2 and P7 to perforate holes at levels 2 and 7 of the document. The remaining pins P1 and P3–P6 will not be elevated, and holes will not be perforated at levels 1 and 3–6 in the line registered with the perforating pins.

In the manner described any number of characters may be successively represented in an in-line code by indicia applied to successive lines in a record medium such as the check 10 of FIG. 1. All that is necessary is for an operator to successively actuate the key switches corresponding to the characters which are desired to be coded onto the check and the mechanism will advance the check one step and perforate holes at the proper levels according to the in-line code of FIG. 3. To apply the in-line coded characters illustrated by way of example in the check 10 of FIG. 1, it will only be necessary for an operator to successively actuate the key switches K8, K0, K3, K1, K6, K5, K9, K4, K0, K3, K8, K6, K3, K0 and K7.

If now the operator desires to apply coded indicia to the record medium or check 10 in the second or plural-line code, he need only actuate the key switch KL which corresponds to the prefix character "L," signifying on the record medium that the following characters are coded in the "legible" code. Such actuation of the switch KL causes the clutch 68 to be energized and the check to be advanced one step. It also causes current to flow into the matrix input terminal iL, thereby energizing the selector solenoids S5 and S7 and causing the punching pins P5 and P7 to perforate holes at those levels which, according to FIG. 3, represent the character "L."

Also, in response to closure of the key switch KL, current will be supplied to a latching coil 128 having an armature 129 associated therewith and forming a part of the latching relay LR. Energization of the latching coil will shift the armature 129 to the right (FIG. 6) so that a latching member 130 will be shifted against the biasing force of a spring 131 and held in that position by a latch hook 132. With this, all of the latching relay contacts LR0 through LR9, LR+, LR—, LRI, LRL, will be shifted to positions opposite to that illustrated in FIG. 6.

This disconnects the information input terminals M0–M9, M+, M—, and ML from the corresponding terminals of the first coding matrix 125, and instead connects those information input terminals in circuit with the solenoids L0–L9, L+, L—, and LI which, as previously explained with reference to FIG. 5, control the rotation of the switch wiper arms with the shaft 115. Moreover, when the latching relay LR is switched to its latched state, an additional set of contacts LRa will be closed to connect the B+ terminal of the voltage source to a bus 135 which leads electrically to all of the switch wipers W0–W9, W+, W—, WI and 114.

The apparatus is now conditioned to apply plural-line legible coded indicia to a record medium to represent any of the several different characters.

For this purpose, a first means is provided to make the feeding mechanism advance the document in a plurality of steps in response to an input signal received on any input terminal. In the present instance, the document is advanced a total of $n+1$ steps, and since in the present example $n$ is equal to 3, the document is advanced a total of four steps in succession. To accomplish this, the several input terminals M0–M9, M+, M— and MI are all connected (through the latching relay contacts in a latched position) through isolating diodes D2 to the clutch coil 68. Therefore, as soon as any one of the key switches is actuated, a short current pulse will flow from the associated storage capacitor through the clutch coil 68, releasing the pawl 64 (FIG. 5) and permitting the shaft 60 to be driven from the motor 55. As the shaft 60 completes its first revolution, however, the auxiliary switch wiper 114 will engage the associated stationary contact $b$ and thus supply current from the bus 135 through an isolating diode 136 to the clutch coil 68, again energizing the latter and causing the shaft 60 to execute a second revolution. As the shaft completes its second revolution, the shaft 115 will have driven the auxiliary wiper 114 into electrical engagement with the stationary contact $c$. This again results in energization of the clutch coil 68 and a third rotation of the shaft 60. It also causes the shaft 115 to drive the auxiliary wiper 114 through 90° and into engagement with the associated electrical contact $d$. This causes the clutch coil to be energized a fourth time, so that the shaft 60 is driven through a fourth revolution. At the same time, the shaft 115 drives the auxiliary wiper 114 to the stationary contact $a$ which is unconnected, so that the clutch coil 68 is not reenergized. In this manner, whenever any of the key switches is actuated, the shaft 60 is caused to execute four successive revolutions, and the feeding means are caused to advance the document engaged therewith four successive steps.

To cause the selector solenoids S1–S7 to be energized in proper combinations so that the desired combination of holes is punched in the succeeding lines of the record medium as the shaft 60 executes four successive revolutions, the several key switches are connected through the respective latching relay contacts to respective ones of the solenoids L0–L9, L+, L—, LI. Whenever any key switch is actuated, the corresponding solenoid will be momentarily energized. This means that the corresponding one of the wipers will be permitted to rotate in four successive steps of 90° with the shaft 115 as the shaft 60 executes four successive revolutions. The first three stationary contacts associated with each of the wiper arms are electrically connected to three input terminals of a second coding matrix 140.

As shown in FIG. 6, this second coding matrix has thirteen groups of input conductors, each group having three conductors labeled *a*, *b* and *c*, corresponding to the three successive lines *a*, *b* and *c* of a plural-line code for the difference characters. The coding matrix 140, moreover, has seven output lines which, in common with the output lines of the first coding matrix 125, lead to the seven selector solenoids S1–S7. Each of the input conductors of the coding matrix 140 is connected to the seven output conductors through a combination of unidirectionally conductive devices or diodes which will result in energization of the proper combination of the selector solenoids when that input conductor receives current.

For example, consider the character "2" and the three input lines *a*, *b* and *c*, corresponding to the character "2." Perforations must appear at levels 2, 5 and 6 in the first line *a* of a plural-line code for this character (FIG. 2). As indicated in FIG. 6, diodes 141 are connected between the input conductor leading from the stationary *a* terminal associated with the wiper W2 and poled to conduct current from the bus 135 to the selector solenoids S2, S5 and S6 whenever the wiper W2 connects with the associated stationary contact *a*.

As the wiper W2 next contacts the associated stationary contact *b*, current flows from the bus 135 through three diodes 142 to selector solenoids S1, S4 and S6. This agrees with the coding requirement of FIG. 2, indicating that perforations are to be punched in the second or *b* line by the character "2" at levels 1, 4 and 6.

Finally, as the wiper W2 engages the stationary contact *c* associated therewith, current flows through diodes 143 to selector solenoids S2, S3, S6 and S7. This combination corresponds to the requirement (FIG. 2) that the third line of a plural-line code for the character "2" contains perforations at levels 2, 3, 6 and 7.

From the foregoing illustration, it will be apparent from an inspection of FIG. 6 as to why and where the several diodes in the coding matrix 140 are converted. As any of the groups of three input lines *a*, *b* and *c* (corresponding to any of the characters to be represented) are successively energized, the selector solenoids will be energized in successive combinations which correspond to the combinations of perforations which must appear in three successive lines in order to represent any desired character according to the plural-line legible code of FIG. 2.

A brief summary of the operation of the apparatus to apply plural-line coded indicia to the record medium will be helpful. Whenever characters are to be represented according to the plural-line code, the latching relay LR will be latched and its contacts switched from the positions illustrated in FIG. 6. With this, actuation of any of the switches K0–K9, K+, K—, or KI will result in energization of the clutch coil 68, followed by three successive energizations of that clutch coil from the bus 135 through the auxiliary wiper 114. Thus, the mechanism of FIG. 5 will be caused to advance the document or record medium four successive steps. As soon as the shaft 60 of FIG. 5 begins its initial revolution, the gears 117, 116, will drive the shaft 115 at a reduced ratio of 4:1. At the time that a particular one of the input key switches was actuated, the associated one of the clutch coils L0–L9, L+, L— or LI was energized, thereby lifting the associated pawl 118 (FIG. 5) and permitting the corresponding one of the wiper arms W0–W9, W+, W— or WI, to rotate with the shaft 115. As the shaft 60 makes its first revolution, that one wiper will engage the first stationary contact associated therewith and will pass current from the bus 135 into the first of the group of three input lines for the matrix 140 associated therewith. Thus, the selector solenoids S1–S7 will be energized in a particular combination corresponding to the required locations of perforations in the first line of a plural-line code for the character assigned to the actuated key. Therefore, as the shaft 60 completes its first revolution, the perforating pins P1–P7 will be actuated in the desired combination to punch the perforations at the proper locations in the first line of a plural-line code group. Then, as the shaft 60 begins its second revolution, the particular wiper which is rotating with the shaft 115 will engage the second stationary contact associated therewith. This will supply current to the *b* input line associated with that wiper, and cause the diode matrix 140 to energize the selector solenoids S1–S7 in a second combination which corresponds to the locations of perforations in the second line of the plural-line code group for the character assigned to the key which has been actuated. Thus, the perforating pins will punch the desired combination of holes in the second line as the shaft 60 completes its second revolution.

As the shaft 60 begins its third revolution, the selected one of the switch wipers will engage the third stationary contact *c* associated therewith and pass current from the bus 135 into the third input line for the diode matrix 140. This will cause the selector solenoids S1–S7 to be energized in a particular combination corresponding to the necessary locations of perforations in the third line of the character to be represented. Accordingly, the perforating pins P1–P7 will be actuated in a particular combination to punch holes at the proper levels for the third line of the plural-line code of the character to be represented. Finally, as the shaft 60 executes its fourth revolution, the particular wiper which has been rotating with the shaft 115 will return to its home position as illustrated in FIG. 6. It will not supply an input signal to the diode matrix 140 so that none of the selector solenoids S1–S7 will be energized, and none of the perforating pins P1–P7 will be activated to punch a hole in the record medium. Accordingly, a one-line space will be left on the record medium between the plural-line code group applied in response to the actuation of a key switch, and the next character which will be applied in response to the succeeding actuation of a key switch.

Thus, after the character "L" has been applied to the check 10 in FIG. 1, the succeeding plural-line legible characters can be applied thereto simply by the operator successively actuating the key switches assigned to the characters +, 3, 9, 1, 5, and 8. In response to each actuation of a key, the record medium or check will be advanced four successive steps and with each step a particular combination of perforations will be applied to the check to represent the character according to the plural-line code of FIG. 2. A space will be automatically inserted between the successive groups of three perforation lines which constitute each character representation.

If now, the operator should again desire to apply indicia to the record medium or document to represent characters according to the in-line code, he need only first actuate that key switch which corresponds to the prefix character "I." When that key switch is actuated with the latching relay in its latched position, the clutch coil 68 will be initially energized through one of the diodes D2 and then successively energized by the auxiliary wiper 114 so that the shaft 60 executes four successive revolutions. Moreover, the rotary wiper WI in moving successively into engagement with the associated stationary contacts *a*, *b* and *c*, will cause the diode matrix 140 to successively energize the selector solenoids S1–S7 in different combinations so that the character "I" is applied (according to the plural-line code of FIG. 2) to the record medium. As the shaft 60 executes its fourth revolution, the shaft 115 will drive the wiper WI into momentary engagement with its fourth stationary contact *d*, which as shown in FIG. 6, is connected to an unlatching coil 150 having an armature 151 associated with the latching hook 132. Thus, just after the prefix character "I" is applied to the record medium, current will flow from the bus 135 through the wiper WI to the unlatching coil 150, thereby shifting the latch hook 132 free of the latching member 130. The spring 131 will shift the armature 129 to an unlatched position, thereby restoring all of the latching relay contacts to the positions illustrated in FIG. 6. With this, the latching relay contacts LRa are open to disconnect the bus 135 from the voltage source, so that no current can flow to or through the various wiper arms. Also, the several latching relay contacts LR0–LR9, LR+, LR—, LRI, and LRL are restored to their original positions so that further input signals received on the input terminals, i.e., further actuation of the character key switches, will result in the application of in-line code indicia to the record medium, as previously described.

The latching relay LR is a bi-state device and serves to selectively and complementally interconnect the first coding means 125 and the second coding means (represented by the coils L0–L9, L+, L—, LI, the rotary switch wipers W0–W9, W+, W—, WI, and the second coding matrix 140) with the indicia-applying elements or perforating pins P1–P7. Whenever one of the coding means is effective, the other is ineffective, and vice versa. In the preferred arrangement here illustrated, the bi-state device or latching relay LR is switched from one of its states to the other automatically in response to an input signal being received on the input terminal which corresponds to the prefix characters "L" and "I."

Moreover, momentary actuation of any key switch when the apparatus is operating to apply indicia according to a plural-line code results in starting of the feeding mechanism to produce four successive stepped advances of the record medium, and also results in the corresponding one of the wiper arms being released for rotation with the shaft 115. Because this wiper arm, when once released, will not return to its home position until the shaft 60 has executed four successive revolutions, and because the wiper arm, when once released, is not relocked until it returns to its home position, the wiper arm mechanism constitutes a connecting device which "remembers" or "holds" the fact that a particular one of the key switches has been actuated, even though the key switch is pressed for but a fraction of a second. Then, as the shaft 60 completes its four successive revolutions, this "held" information is utilized to actuate the indicia-applying elements or perforating pins in the necessary and desired successive combinations to apply perforations at the proper levels in successive lines of a plural-line code group.

FIG. 7 illustrates a modified form of the invention which is somewhat simpler as to the components required. The mechanism of FIG. 5 is employed, but all of the components shown to the left of the gear 117 in FIG. 5 are not needed. In their place is used a normally open switch CS which is momentarily actuated by a cam 170 on the shaft 60 each time that the latter has passed about half way from its normal position through one revolution.

The input terminals M0–M9, M+, M—, MI and ML; the key switches K0–K9, K+, K—, KI, KL; and the storage capacitors C0–C9, C+, C—, CI, CL, shown in FIG. 7 are identical to those previously described in connection with FIG. 6. Also, the latching relay LR and its components shown in FIG. 7 are the same as previously described in connection with FIG. 6. This is also true of the two coding matrices 125 and 140, and these are shown only in block form in FIG. 7.

With the latching relay LR in its unlatched state, as shown in FIG. 7, actuation of any of the key switches will result in a current pulse being supplied to the corresponding one of the in-line coding matrix terminals i0–i9, i+, i—, or iL, and in energization of the appropriate combination of the selector solenoids S1–S7, as previously described. To cause the feeding mechanism of FIG. 5 to advance the record medium one step, a plurality of isolating diodes 172 are all connected with like polarity between the common output conductors of the diode matrices 125, 140 and the clutch coil 68. Therefore, whenever any combination of the selector solenoids is energized, the clutch coil 68 will also be energized so that the record medium will be advanced one step and the appropriate combination of perforations punched in the record medium according to the in-line code of FIG. 3.

To condition the apparatus of FIG. 7 for application of characters to the record medium in a plural-line code, the key switch KL will first be actuated. This causes the solenoids S5 and S7 to be energized by current flowing through the terminal iL, and also causes the clutch coil 68 to be energized so that the prefix character "L" will be applied in the in-line code to the record medium. Moreover, closure of the prefix character key switch KL will also result in current flow from the associated storage capacitor CL to the latching coil 128 of the latching relay LR so that the latter will switch states and change its movable contacts from the positions illustrated in FIG. 7 to their opposite positions.

With this, the input terminals assigned to the several characters, i.e., the terminals M0–M9, M+, M—, and MI, will be connected through the corresponding latching relay contacts to the coils of a corresponding plurality of relays R0–R9, R+, R—, and RI. The opposite ends of these relay coils are connected directly to ground, as indicated, so that upon closure of any one of the key switches with the latching relay in its latched state, a corresponding one of the relays will be energized. Moreover, when any one of the relays is energized, it will be sealed in through the corresponding sealing contacts R0s–R9s, R+s, R—s, or RIs, all of which are connected to a sealing bus 174 which leads through normally closed relay contacts SRa to the positive terminal of a voltage source, here represented by the symbol B+.

Each of the relays R0–R9, R+, R— and RI, shown in FIG. 7, has three normally open contacts. As shown in FIG. 7, a first series of these normally open contacts R0a–R9a, R+a, R—a and RIa, lead from a common connector or bus 175 to the "a" input conductors for the coding matrix 140. In like manner, the normally open relay contacts R0b–R9b, R+b, R—b and RIb lead from a common bus 176 to the "b" input conductors corresponding to the several characters for the coding matrix 140. Finally, the normally open contacts R0c–R9c, R+c, R—c and RIc lead from a common bus 177 to the "c" input conductors assigned to the respective characters for the coding matrix 140.

The input buses 175, 176 and 177 lead directly to stationary contacts a, b and c, associated with the movable contact arm A1 of a stepping switch SS. This stepping switch is one in which the arm A1 can step successively to four different positions or contact points represented by the lower case alphabetical characters a, b, c and d. Moreover, the stepping switch includes a second rotatable contact arm A2 which is driven in unison with the arm A1 to engage successively stationary contacts a, b, c and d. The two arms A1 and A2 are stepped from one position to the next in response to momentary energization of a stepping coil SC. As shown, the two movable wipers A1 and A2 are permanently connected to the positive B+ terminal.

Assuming now that the movable arms A1 and A2 are initially in their home positions, i.e., engaged with the stationary a contacts, and assuming that the latching relay LR is in its latched state, then actuation, even though for but an instant, of any one of the key switches assigned to any one of the several characters will result in the corresponding one of relays R0–R9, R+, R—, or RI being energized and sealed in. When so sealed in, that relay "holds" or "remembers" the fact that a particular input signal has been received. Assume, by way of example, that the key switch K7 has been actuated so that current momentarily flows from the storage capacitor C7 through the input terminal M7 and the latching relay contacts LR7 to the coil R7. The relay R7 will pick up, its contacts R7s closing to seal in that relay by a current conduction path from the B+ terminal through the normally closed contacts SRa, a sealing bus 174 and through the contacts R7s to the coil R7. Also, its contacts R7a, R7b, and R7c will be closed, completing connections from the buses 175, 176, 177 to three output terminals which in this instance are connected to number "7" a, b, and c inputs of the coding matrix.

As soon as these contacts R7a, R7b and R7c close, a current flow path is created from the B+ terminal through the stepping arm A1, the bus 175, and the contacts R7a to the "a" input conductor for the character "7" in the coding matrix 140. With this, the selector solenoids S1, S4, S5 and S6 are simultaneously energized to release the associated interposers 86 (FIG. 5). Also, current flows through the corresponding ones of the diodes 172 (FIG. 7) to energize the clutch coil 68. Accordingly, the shaft 60 is released to rotate through one revolution, causing the floating levers 92 to raise those particular perforating pins which correspond to the selector solenoids previously energized.

As the shaft 60 is approximately half way through this first revolution, the cam switch CS (FIGS. 5 and 7) will be momentarily closed and will thus energize the stepping coil SC. This effects stepping of arms A1 and A2 to the stationary contacts b. With this, a current flow path is created from the B+ terminal, through the arm A1, the bus 176, and the closed contacts R7b to the "b" input terminal for the character "7" in the matrix 140. The selector solenoids S1 and S3 are simultaneously energized to release the corresponding interposers and current flows through two of the diodes 172 to again energize the clutch coil 68.

Accordingly, the shaft 60 will execute a second revolution, and cause the perforating pins to punch holes at levels 1 and 3 in a second perforation line. This is what is required according to the plural-line code for the character "7," as shown in FIG. 2.

As the shaft 60 is executing its second revolution, the cam switch CS will again be momentarily closed, thus energizing the stepping coil SC, and causing the wiper arms A1 and A2 to be advanced into engagement with their associated stationary "c" contacts.

This creates a current flow path from the B+ terminal through the stepping arm A1, the bus 177, and the closed contacts R7c to the "c" input terminal for the character "7" in the coding matrix 140. Accordingly, the selector solenoids S1, S2 and S7 will be simultaneously energized to release the corresponding interposers, and current will flow through some of the diodes 172 to energize the clutch coil 68 for a third time.

Thus, the shaft 60 will be caused to rotate through a third revolution, and the perforating pins will be activated to punch holes at levels 1, 2 and 7 in a third perforation line, as required by the plural-line code for the character "7."

As the shaft 60 is about half-way through this third revolution, the cam switch CS will close again, thereby energizing the stepping coil SC and causing the wipers A1 and A2 to advance to their fourth stationary contacts "d." A current flow path is created from the B+ terminal through the arm A1 to the coil SR of a spacing and reset relay. Energization of this relay causes opening of its normally closed contacts SRa, so that the bus 174 is disconnected from the B+ terminal and the relay which was previously sealed in, e.g., relay R7, is dropped out thereby "releasing" the information previously "held" by that relay. Moreover, pickup of the relay SR results in closure of its normally open contacts SRc so that a current flow path is created through the latching relay contacts LRa to the clutch coil 68. Accordingly, the shaft 60 is driven through a fourth revolution, but because none of the selector solenoids S1–S7 has been energized, no holes will be punched in the record medium. This fourth revolution of the shaft 60 results in a space being created between the last line of a plural-line code and the first line of the succeeding coded character.

In this manner, the operator can successively actuate the different key switches to apply any of the characters to the record medium in plural-line coded indicia.

When the operator desires again to apply characters to the record medium in the in-line code, he need only actuate the key switch KI assigned to the prefix code "I." Closure of this key switch KI not only results in pickup and seal-in of the relay RI, and the action of the stepping switch SS previously described, so that the character "I" is represented in plural-line code on the record medium; but also results in current flow from the storage capacitor CI to the unlatching coil 150 associated with the latching relay LR. Thus, the latching relay LR is returned to its first or unlatched state, and all of its contacts are restored to the positions illustrated in FIG. 7. Therefore, as additional ones of the key switches are actuated the record medium will be advanced only one step at a time and perforations will be applied according to the in-line code of FIG. 3.

Whenever indicia is being applied to a record medium to represent characters in the in-line code, the cam switch CS will, nevertheless, be closed once each time that the clutch coil 68 is energized and the shaft 60 makes one revolution. Thus, the arms A1 and A2 of the stepping switch SS will continue to step, but this will supply no current to the input conductors of the coding matrix 140 since none of the relays R0–R9, R+, R—, and RI will be energized. However, it is important to make certain that the stepping switch arm A1 is at its home position after the last in-line code character "L" has been applied to the record medium and the next character is to be in plural-line code form.

For this purpose, a second stepping arm A2 is employed together with a homing relay HR. Whenever the key switch KL for the character "L" is actuated to cause application of the in-line code for the character "L" to the record medium and to cause the latching relay LR to be latched, current flows also from the storage capacitor CL through normally closed contacts SRb (controlled by the relay SR) to the coil of the homing relay HR. The latter will be picked up, and will seal in through its own contacts HRa and the normally closed contacts SRa.

Also contacts HRb will close, connecting the stationary contacts b and c associated with the arm A2 in circuit with the stepping coil SC.

Assume that the stepping arms A1 and A2 happen to be in the home positions illustrated just prior to actuation of the key switch KL. Actuation of that key will result in energization of the clutch coil 68 so that the shaft 60 executes one revolution during the application of the in-line code perforations which represent the character "L." During this revolution of the shaft 60, the cam switch CS will be closed and the stepping coil momentarily energized. The arms A1 and A2 will, therefore, be advanced to their stationary "b" contacts. However, closure of the key switch KL also results in pickup and seal-in of the homing relay HR. Accordingly, the contacts HRb are now closed. Therefore, as soon as the stepping arm A2 engages its stationary contact b, a current flow path is created from the B+ terminal through the stepping arm A2 and the now closed contacts HRb to the stepping coil SC. Accordingly, the stepping coil SC is energized a second time and the arms A1 and A2 are advanced to their "c" contacts. This movement of the stepping arm A2 results in interruption of current supplied to the stepping coil SC. However, as soon as the arm A2 engages its stationary contact "c," a current flow path is again established from the B+ terminal through the arm A2, and the closed contacts HRb to the stepping coil SC.

Accordingly, the arms A1 and A2 are advanced to their stationary contact points "d." When this occurs, a current flow path is created from the B+ terminal through the arm A1 to the spacing and reset relay SR. The later thus picks up and opens its normally closed contacts SRa and SRb. Opening of the contacts SRa results in de-energization of the homing relay HR, so that the contacts HRb are reopened. However, pick-up of the relay SR also results in closure of its contacts SRc, so that the clutch coil 68 is energized to make the shaft 60 execute one revolution. This results in a space or vacant line being created in the record medium prior to the beginning of the first group of lines representing a character according to the plural-line code. This spacing revolution of the shaft 60 also causes the cam 170 (FIG. 5) to momentarily actuate or close the cam switch CS. The cam switch, therefore, momentarily supplies current to the stepping coil SC, so that the latter advances the arms A1 and A2 to the "home" position in engagement with stationary "a" contacts. At this point, arms A1 and A2 are in their "home" positions, and the apparatus is conditioned to apply indicia according to the plural-line code of FIG. 2 to represent on a record medium the different characters in response to actuation of the corresponding key switches.

If the stepping arms A1, A2 should be in engagement with their b, c or d contacts when the key switch KL is actuated, the foregoing "homing" operation will take place, although a fewer number of steps are required for the arms to reach their home positions.

There has been provided here a system for accurately applying indicia to a record medium to represent different characters according to either of two code systems, the first being an in-line code system which can be used to represent a relatively great number of characters in a relatively small space, and the second being a plural-line coding system which can advantageously be made to represent characters in legible form, yet by indicia which are susceptible of automatic reading equipment. The use and practice of the present invention in business procedures will enhance automatic processing and handling of business documents which carry significant figures susceptible of reading and processing in automatic equipment.

We claim as our invention:

1. In apparatus for applying indicia to a record medium to represent characters in either a plural-line or in-line code, the combination comprising a plurality of indicia-applying elements, means for advancing the medium relative to said elements, a plurality of input members adapted to receive signals one at a time and assigned to a corresponding plurality of different characters, first means responsive to a signal received by any one of said members for actuating said elements to apply indicia in a single line on said medium and which indicia represents according to the in-line code the character corresponding to that one member, second means responsive to a signal received by any one of said members for actuating said elements to apply indicia in a plurality of lines on said medium and which indicia represents according to the plural-line code the character corresponding to that one member, and means for selectively and complementally activating said first and second means.

2. The combination set forth in claim 1 further characterized in that the last-named means includes means for transferring operative connection of said input members from said first means to said second means, and vice versa, in response to signals received on one or the other of two of said input members which are assigned to prefix characters designating on said record medium that the following characters are represented in plural-line or in-line code.

3. In apparatus for applying coded indicia to a record medium, the combination comprising a plurality of indicia-applying elements, means for advancing said medium past said elements, a plurality of input members adapted to receive signals one at a time and each assigned to one of a plurality of different characters, first means responsive to a signal received by any one of said members for actuating said indicia-applying elements in a combination corresponding to an in-line code for the character assigned to that member, second means responsive to a signal received by any one of said members for actuating said indicia-applying elements successively in n combinations which correspond to the locations of indicia in successive lines of a plural-line code having n lines for the character assigned to that member, and means for selectively and complementally rendering operative said first and second means.

4. In apparatus for applying indicia to a record medium to represent characters in either a plural-line, legible code or an in-line, illegible code, the combination comprising a plurality of indicia-applying elements arranged in a line, means for feeding the record means past said elements, a plurality of keys each assigned to one of a plurality of characters, first means responsive to actuation of any of said keys for actuating said feeding means to move the medium one step and for actuating a particular combination of said elements corresponding to an in-line code for the character assigned to that one key, second means responsive to actuation of any one of said keys for actuating said feeding means to move the medium $n+1$ steps and for successively actuating said elements in n successive combinations corresponding to indicia locations for the successive lines of an n-line legible code for the character assigned to that one key, means responsive to actuation of one of said keys assigned to a plural-line code-identifying prefix character for switching operative connection of said keys from said first means to said second means, and means responsive to actuation of one of said keys assigned to an in-line code-identifying prefix character for switching operative connection of said keys from said second means to said first means.

5. In apparatus for applying perforations to a record medium to represent characters in either a plural-line, legible perforation code or an in-line, illegible perforation code, the combination comprising a plurality of perforating pins arranged in a row, means for feeding the record medium intermittently past said pins, a plurality of selector solenoids each corresponding to one of said pins, means for imparting perforating movement to those ones of said pins which correspond to those of said solenoids which have been energized, a plurality of key switches each assigned to one of a plurality of characters, first means responsive to actuation of any one of said key switches for causing said feeding means to advance the medium one step and for energizing a corresponding particular combination of said solenoids, second means responsive to actuation of any one of said key switches for causing said feeding means to advance the medium in $n+1$ successive steps and for energizing said solenoids prior to the first n steps successively in n particular combinations corresponding to the perforation positions in the successive lines of an n-line legible perforation code, transfer means selectively connecting said key switches to said first and second means, and means responsive to the perforation of an in-line prefix character or an n-line prefix character in the medium for causing said transfer means to connect said second or first means, respectively, to said key switches.

6. Apparatus for applying coded indicia representative of different ones of a plurality of characters to a record medium comprising, in combination, a plurality of indicia-applying elements arranged in a row, means for feeding a record medium in steps past said elements, a plurality of input terminals adapted to receive signals one at a time and each assigned to one of a plurality of characters, first means for causing said feeding means to advance the record medium one step in response to a signal received on any one of said input terminals and for actuating a combination of said elements corresponding to an in-line code for the character assigned to that one input terminal, second means for causing said feeding means to advance the record medium a plurality of steps in succession in response to a signal received by any one of said input terminals, a plurality of rotary parts each assigned to one of said characters, means responsive to a signal received by any one of said input terminals for causing the corresponding one of said rotary parts to be driven through a plurality of angular increments as the medium is advanced a corresponding plurality of steps, means controlled by each of said rotary parts as it passes through successive angular increments for actuating said elements in successive combinations corresponding to indicia locations for successive lines of a plural-line code for the corresponding character, and means for complementally rendering said first and second means active and inactive.

7. In apparatus for applying coded indicia to a record medium to represent different ones of a plurality of characters thereon, the combination comprising a plurality of indicia-applying elements arranged in a row, means for feeding the record medium in steps past said row of elements, a plurality of input members adapted to receive signals one at a time and each assigned to one of the characters, first means for causing said feeding means to advance the medium one step in response to a signal received by any one of said input members and for actuating said elements in a combination corresponding to an in-line code for the character assigned to said one input mmeber, second means for causing said feeding means to advance the medium through $(n+1)$ successive steps in response to a signal received by any one of said input members and for successively actuating said elements in $n$ combinations corresponding to an $n$-line code for the character assigned to that one input member, means for complementally rendering said first and second means effective and ineffective, said second means including a plurality of rotary elements, means for selectively connecting said rotary parts to be driven through $(n+1)$ equal angular increments by said feeding means in response to an input signal received by a corresponding one of said input members, and means controlled by each of said parts as it passes through $n$ increments for actuating said elements successively in $n$ combinations.

8. Apparatus for applying coded indicia to a record medium to represent different ones of a plurality of characters thereon, said apparatus comprising, in combination, a plurality of input switches each assigned to one of the characters, a plurality of indicia-applying elements alined in a row, a plurality of solenoids each corresponding to one of said elements, means for feeding the record medium in steps past said row of elements and then actuating those ones of said elements corresponding to those ones of said solenoids which were previously energized, a first in-line coding means having an input terminal for each of said characters and output terminals connected to said solenoids, a second plural-line coding means having a plurality of $n$ input terminals for each of said characters and output terminals connected to said solenoids, a plurality of rotary switches corresponding to said characters and each having an input wiper and $n+1$ output contacts, means connecting the first $n$ output contacts of each rotary switch to he corresponding $n$ input terminals of said second coding means, a shaft, means for driving said shaft through $$\frac{1}{n+1}$$

revolutions each time that said feeding means advances said medium through one step, a plurality of normally slippable clutches connecting respective ones of said wipers to said shaft, said clutches each having a controlling coil which when energized permits the clutch to drive the associated wiper through one revolution, a bi-state device, means for connecting said input switches to corresponding terminals of said first coding means when said device is in its first state, means for connecting said input switches to corresponding ones of said clutch coils when said device is in its second state, means for causing said feeding means to advance the medium one step in response to actuation of any of said input switches, and means for causing said feeding means to advance the medium $n$ additional steps in response to actuation of any one of said input switches if said bi-state device is in its second state.

9. The combination set forth in claim 9 further characterized by means for setting said bi-state device to its first or second states in response to actuation of first or second ones of said input switches which are assigned to prefix characters indicative that the characters immediately following are to be represented on said medium by in-line or plural-line codes.

10. Apparatus for applying coded indicia representing different characters to a record medium, said apparatus comprising, in combination, a plurality of indicia-applying elements arranged in a row, means for feeding the record medium in steps past the said elements, a plurality of input members adapted to receive signals one at a time and each assigned to one of a plurality of characters, first means responsive to a signal received by any of said input members for causing said feeding means to advance the medium one step and for actuating a combination of said elements which corresponds to an in-line code for the character assigned to that one input member, second means for causing said feeding means to advance the medium a plurality of steps in succession in response to a signal received by any one of said input members, a plurality of relays each corresponding to one of said characters, means for picking up and holding the corresponding relay in response to a signal received by one of said input terminals, means controlled by a picked-up relay for actuating said elements successively in a plurality of combinations corresponding to successive lines of a plural-line code as said medium is advanced a plurality of steps, and means for selectively and complementally rendering said first and second means active and inactive.

11. Apparatus for applying coded indicia to a record medium to represent a plurality of characters according to either of two codes, the first code being an in-line, illegible code and the second code being a plural-line, legible code, said apparatus comprising, in combination, a plurality of input members each assigned to one character, a plurality of indicia-applying elements arranged in a row, means for feeding the record medium in steps past said elements, first means responsive to a signal received by any one of said input members for causing said feeding means to advance the medium one step and for actuating a combination of said elements according to an in-line code for the character assigned to that input member, second means for causing said feeding means to advance the record medium a plurality of steps in succession in response to a signal received by any one of said input members, said second means including a plurality of connecting devices each actuated in response to an input signal received by a corresponding one of said input members, each said connecting device having a plurality of output terminals, means for successively energizing the output terminals of an actuated connecting device as said feeding means advances the medium a plurality of steps, means responsive to successive energization of the output terminals of a connecting device for actuating said indicia-applying elements in successive combinations according to indicia locations in successive lines of a plural-line code for the character corresponding to that connecting device, means for de-actuating each actuated connecting device after all of its output terminals have been energized, and a bi-state device settable to either of two states and having means to selectively connect either said first means or said second means operatively with said input members.

12. In apparatus for applying indicia to a record medium to represent different characters according to either an in-line code or a plural-line code, the combination comprising a plurality of input members adapted to receive signals one at a time and each assigned to one of a plurality of characters, a plurality of indicia-applying elements arranged in a row, means for feeding the record medium in steps past said elements, first means responsive to an input signal received by any one of said input members for making said feeding means advance the medium one step and for actuating a combination of said elements corresponding to the in-line code for the character assigned to that key, second means responsive to an input signal received by any one of said input members for making said feeding means advance the medium $n+1$ steps in succession and for actuating successive combinations of said elements corresponding to successive lines of an $n$-line code for the character assigned to that key, said second means including a stepping switch and a plurality of connecting devices, means for causing said stepping switch to step $n+1$ times in response to an input signal received by any one of said input members and for actuating a corresponding one of said connecting devices, means controlled by an actuated connecting device for actuating a particular combination of said elements and causing said feeding means to advance the medium one step as said stepping switch executes $n$ of the $n+1$ steps, and means for selectively and complementally rendering said first and second means operative and inoperative.

13. In apparatus for applying indicia to a record medium to represent characters according to an $n$-line, legible code, the combination comprising a plurality of indicia-applying elements arranged in a row, a plurality of input members each assigned to one of a plurality of characters, means responsive to the reception of an input signal by any one of said input members for advancing said medium $n+1$ successive steps past said elements, a plurality of rotary wipers each corresponding to one of said input members, means for driving the one wiper corresponding to the input terminal which receives a signal through $n+1$ angular increments as the medium is advanced $n+1$ steps, and means responsive to the passage of a rotary wiper through $n$ angular increments for actuating said elements in $n$ combinations corresponding to the locations of indicia in the $n$ successive lines of a code for the character corresponding to that wiper.

14. In apparatus for applying a legible pattern of perforations in a field of $n$-lines to represent different characters on a record medium, the combination comprising a plurality of movable perforating pins arranged in a row, a plurality of input members each assigned to one of a plurality of characters, a relay for each input member, means responsive to reception of an input signal by any one of said input members for picking up the associated relay and for advancing the medium $n+1$ successive steps past said pins, said means controlled by a picked-up relay for shifting said pins in $n$ successive combinations to punch holes in said mediums at predetermined locations in each of $n$ successive lines according to the $n$-line code for the character corresponding to that relay.

15. In apparatus for applying indicia to a record medium to represent characters thereon in either a plural-line or in-line code, the combination comprising a plurality of input members each corresponding to one of a plurality of different characters and adapted to receive signals one at a time, first means responsive to a signal received by any one of said input members for applying to said record medium a single line of indicia uniquely representative of the character corresponding to that member according to the in-line code, second means responsive to a signal received by any one of said input members for applying a plurality of lines of indicia to said record medium which legibly and visibly represents the character corresponding to that member according to the plural-line code, and means for selectively and complementally activating said first and second means.

16. In apparatus for applying indicia to a record medium to represent different characters thereon, the combination comprising a plurality of input members each corresponding to one of a plurality of different characters and adapted to receive signals one at a time, first means responsive to a signal received by any one of said input members for applying to said record medium a single line of indicia uniquely representative of the character corresponding to that member, the said single line of indicia representative of any character being coded so as to consume a relatively small area on the surface of said medium, second means responsive to a signal received by any one of said input members for applying a plurality of lines of indicia to said record medium which legibly represents the character corresponding to that member, the said plurality of lines of indicia representative of substantially any character being coded so as to consume a relatively large area compared to said small area on the surface of said medium, and means for selectively and complementally activating said first and second means.

17. The combination set forth in claim 3 further characterized by the inclusion of means for advancing said record medium one step following the operation of said second means, so that a space occurs on the medium between successive sets of $n$ lines for plural-line code character representations.

18. In apparatus for applying coded indicia to a record medium, the combination comprising a plurality of indicia-applying elements arranged in a single line, means for advancing a record medium a step at a time past said indicia-applying elements, a plurality of input terminals each corresponding to one of a plurality of characters and adapted to receive a signal one at a time, a first coder responsive to a signal on any of said input terminals and having means to actuate said indicia-applying elements in a combination corresponding to an in-line code for the character of that terminal, first means for actuating said advancing means through one step each time that said first coder receives a signal, a second coder responsive to a signal on any one of said input terminals and having means to actuate said indicia-applying elements in combinations corresponding to the positions of indicia in successive lines of a plural-line code for the character of that terminal, second means for actuating said advancing means a number of steps equal to one more than the number of lines in a plural-line code each time that said second coder receives a signal, and means for selectively and complementally rendering said first coder and said second coder operative so that character indicia is applied to the record medium in either in-line or plural-line code.

19. In apparatus for applying indicia to a record medium to represent selected ones of a plurality of diverse characters with each character represented by a plural-line code, the combination comprising, a plurality of indicia-applying elements arranged in a row, a plurality of input members each assigned to one of said plurality of diverse characters, means responsive to receiption of an input signal by any one of said input members for advancing said medium past said elements a plurality of steps in succession, and means for actuating said row of elements in a plurality of successive selected combinations corresponding to the plural-line code for the character assigned to the said any one input member so that the lines of indicia in said plural-line code for that character are successively applied to said medium.

20. In apparatus for applying a legible pattern of perforations in a field of $n$-lines to represent a selected one of diverse characters on a record medium, the combination comprising, a plurality of punches arranged in a row, means for actuating selected combinations of said row of punches to produce a line of perforations in said medium at predetermined locations, means for effecting relative movement of said medium past the ends of said row of punches, a plurality of input members each assigned to one of said diverse characters and means responsive to a single signal on one of said input members for successively actuating said row of punches in $n$ selected combinations so that a perforation field of $n$-lines is formed in said medium corresponding to the selected one character.

References Cited in the file of this patent
UNITED STATES PATENTS

| | | |
|---|---|---|
| 2,069,240 | Goetz et al. | Feb. 2, 1937 |
| 2,580,788 | Johnson | Jan. 1, 1952 |
| 2,679,902 | Brewer | June 1, 1954 |

UNITED STATES PATENT OFFICE
CERTIFICATE OF CORRECTION

Patent No. 3,033,444

May 8, 1962

James L. Quinn et al.

It is hereby certified that error appears in the above numbered patent requiring correction and that the said Letters Patent should read as corrected below.

Column 6, line 28, for "pine" read -- pins --; line 67, for "wtih" read -- with --; column 19, line 30, for "mmeber" read -- member --; column 21, line 57, for "said", second occurrence, read -- and --.

Signed and sealed this 19th day of March 1963.

(SEAL)
Attest:

ESTON G. JOHNSON
Attesting Officer

DAVID L. LADD
Commissioner of Patents